(12) United States Patent
Ogawa et al.

(10) Patent No.: US 8,587,923 B2
(45) Date of Patent: *Nov. 19, 2013

(54) LAMINATED ELECTRONIC COMPONENT INCLUDING WATER REPELLANT AND MANUFACTURING METHOD THEREFOR

(75) Inventors: Makoto Ogawa, Fukui (JP); Akihiro Motoki, Fukui (JP); Masahito Saruban, Fukui (JP); Toshiyuki Iwanaga, Sabae (JP); Shunsuke Takeuchi, Echizen (JP); Kenichi Kawasaki, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 347 days.

This patent is subject to a terminal disclaimer.

(21) Appl. No.: 12/788,340

(22) Filed: May 27, 2010

(65) Prior Publication Data
US 2010/0302704 A1 Dec. 2, 2010

(30) Foreign Application Priority Data
Jun. 1, 2009 (JP) ................................. 2009-131828

(51) Int. Cl.
*H01G 4/228* (2006.01)
*H01G 4/06* (2006.01)

(52) U.S. Cl.
USPC ..................................... 361/306.3; 361/321.2

(58) Field of Classification Search
USPC ....................... 361/306.3, 306.1, 321.3, 321.2
See application file for complete search history.

(56) References Cited

U.S. PATENT DOCUMENTS

| 6,381,117 | B1 * | 4/2002 | Nakagawa et al. ........ 361/306.3 |
| 6,660,424 | B1 | 12/2003 | Gyoten et al. |
| 6,693,793 | B2 * | 2/2004 | Kuwako et al. ............... 361/323 |
| 6,808,813 | B2 * | 10/2004 | Kimura et al. ................ 428/447 |
| 6,960,366 | B2 | 11/2005 | Ritter et al. |
| 6,972,942 | B2 | 12/2005 | Ritter et al. |
| 6,982,863 | B2 | 1/2006 | Galvagni et al. |

(Continued)

FOREIGN PATENT DOCUMENTS

| CN | 1379421 A | 11/2002 |
| CN | 101356602 A | 1/2009 |

(Continued)

OTHER PUBLICATIONS

Official Communication issued in corresponding Chinese Patent Application No. 201010194072.6, mailed on Nov. 9, 2011.

(Continued)

Primary Examiner — David M Sinclair
(74) Attorney, Agent, or Firm — Keating & Bennett, LLP (57) ABSTRACT

A method for manufacturing a laminated electronic component includes the steps of preparing a laminated component main body, the component main body including internal electrodes formed therein, and each of the internal electrodes being partially exposed on an external surface of the component main body, and forming an external terminal electrode on the external surface of the component main body such that the external terminal electrode is electrically connected to the internal electrodes. The step of forming the external terminal electrode includes the steps of forming a metal layer on exposed surfaces of the internal electrodes, applying a water repellant on a surface of the metal layer and a section of the external surface of the component main body at which an end edge of the metal layer is located, and then forming a conductive resin layer on the metal layer having the water repellant applied thereon.

6 Claims, 3 Drawing Sheets

(56) References Cited

U.S. PATENT DOCUMENTS

| | | | |
|---|---|---|---|
| 7,005,192 B2 * | 2/2006 | Sanada et al. | 428/447 |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 8,009,012 B2 * | 8/2011 | Kajino et al. | 338/309 |
| 8,149,566 B2 * | 4/2012 | Motoki et al. | 361/305 |
| 2003/0007314 A1 | 1/2003 | Sanada et al. | |
| 2004/0006867 A1 * | 1/2004 | Becker et al. | 29/610.1 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0151470 A1 | 6/2008 | Motoki et al. | |
| 2008/0158774 A1 | 7/2008 | Trinh | |
| 2008/0210564 A1 | 9/2008 | Motoki et al. | |
| 2009/0052114 A1 | 2/2009 | Motoki et al. | |

FOREIGN PATENT DOCUMENTS

| | | |
|---|---|---|
| EP | 1 826 787 A1 | 8/2007 |
| JP | 63-169014 A | 7/1988 |
| JP | 6-267784 A | 9/1994 |
| JP | 07-029773 A | 1/1995 |
| JP | 10-116706 A | 5/1998 |
| JP | 10-214741 A | 8/1998 |
| JP | 2000-228205 A | 8/2000 |
| JP | 3304798 B2 | 7/2002 |
| JP | 2002-289464 A | 10/2002 |
| JP | 2002-289465 A | 10/2002 |
| JP | 2004-146401 A | 5/2004 |
| JP | 2004-223559 A | 8/2004 |
| JP | 2007-234800 A | 9/2007 |
| JP | 2008-263011 A | 10/2008 |
| WO | 94/10697 A1 | 5/1994 |
| WO | 2007/049456 A1 | 5/2007 |
| WO | 2007/119281 A1 | 10/2007 |
| WO | 2008/023496 A1 | 2/2008 |

OTHER PUBLICATIONS

Official Communication issued in corresponding Korean Patent Application No. 10-2010-0050856, mailed on Feb. 3, 2012.

Motoki et al., "Laminated Electronic Component and Method for Manufacturing the Same", U.S. Appl. No. 12/043,225, filed Mar. 6, 2008.

Motoki et al., "Laminated Electronic Component and Manufacturing Method Therefor", U.S. Appl. No. 12/781,058, filed May 17, 2010.

Motoki et al., "Multilayer Electronic Component and Method for Manufacturing the Same", U.S. Appl. No. 12/263,556, filed Nov. 3, 2008.

Official Communication issued in corresponding Japanese Patent Application No. 2009-131828, mailed on Mar. 5, 2013.

* cited by examiner

LAMINATED ELECTRONIC COMPONENT INCLUDING WATER REPELLANT AND MANUFACTURING METHOD THEREFOR

BACKGROUND OF THE PRESENT INVENTION

1. Field of the Present Invention

The present invention relates to a laminated electronic component and a method for manufacturing the laminated electronic component, and more particularly, to a structure of an external terminal electrode and a method for forming the external terminal electrode.

2. Description of the Related Art

Figure 3:
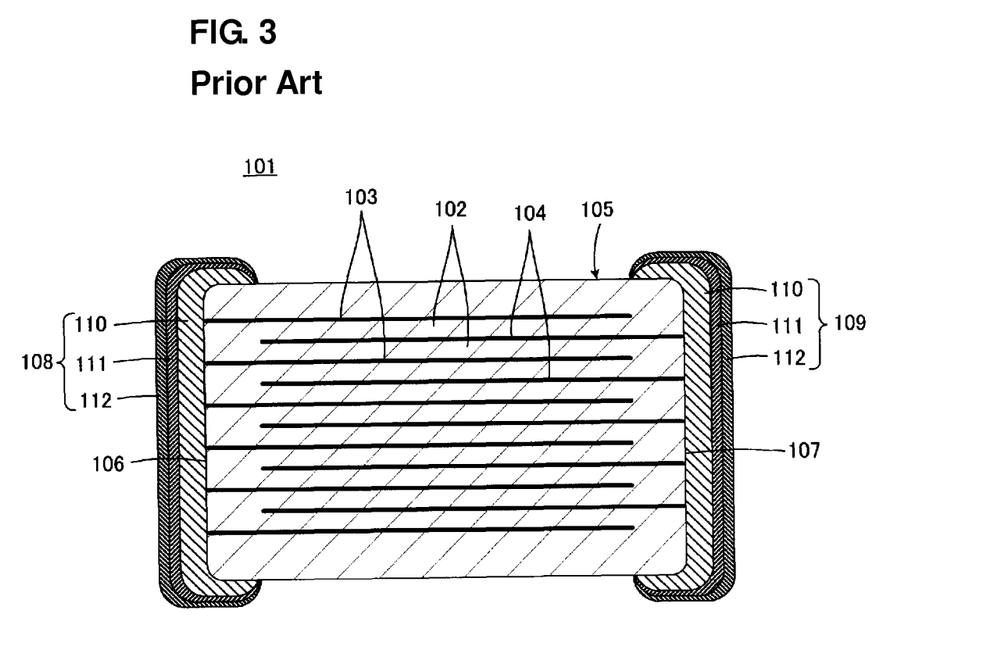
FIG. 3 is a cross-sectional view of a conventional laminated electronic component.

As shown in FIG. 3, a laminated electronic component 101 typified by a laminated ceramic capacitor generally includes a component main body 105 having a laminated structure, which includes a plurality of laminated insulator layers 102 composed of, for example, a dielectric ceramic, and a plurality of layered internal electrodes 103 and 104 formed along interfaces between the adjacent insulator layers 102. Respective ends of the plurality of internal electrodes 103 and respective ends of the plurality of internal electrodes 104 are exposed at one end surface and the other end surface 106 and 107 of the component main body 105, and external terminal electrodes 108 and 109 are respectively arranged so as to electrically connect the respective ends of the internal electrodes 103 to each other and the respective ends of the internal electrodes 104 to each other.

For the formation of the internal terminal electrodes 108 and 109, in general, a metal paste including a metal component and a glass component is applied onto the end surfaces 106 and 107 of the component main body 105, and then baked, thereby first forming baked metal layers 110. Next, first plating layers 111 primarily including, for example, nickel, are formed on the baked metal layers 110, and second plating layers 112 primarily including, for example, tin or gold are further formed thereon. Thus, each of the external terminal electrodes 108 and 109 is formed in a three-layer structure including the baked metal layers 110, the first plating layer 111, and the second plating layer 112.

The external terminal electrodes 108 and 109 are required to have excellent solderability when the laminated electronic component 101 is mounted on a substrate using solder. At the same time, the external terminal electrode 108 is required to have a function of electrically connecting each of the plurality of internal electrodes 103 which are electrically insulated from each other, and the external terminal electrode 109 is required to have a function of electrically connecting each of the plurality of internal electrodes 104 which are electrically insulated from each other. The second plating layers 112 described above ensure the solderability, whereas the baked metal layers 110 electrically connect the internal electrodes 103 to each other and the internal electrodes 104 to each other. The first plating layers 111 prevent solder erosion in solder joint.

However, the baked metal layer 110 has a relatively large thickness from several tens of μm to several hundreds of μm. Therefore, in order to limit the dimensions of the laminated electronic component 101 within certain specifications, there is undesirably a need to reduce the effective volume for ensuring a capacitance because there is a need to ensure the volumes of the baked metal layers 110. On the other hand, the plating layers 111 and 112 have a thickness on the order of several μm. Thus, if the external terminal electrodes 108 and 109 can be composed only of the first plating layers 111 and the second plating layers 112, the effective volume for ensuring the capacitance can be increased.

For example, Japanese Unexamined Patent Publication No. 2004-146401 discloses a method in which a conductive paste is applied to at least ridge sections of end surfaces of a component main body along the direction of laminating internal electrodes so as to come into contact with leading sections of the internal electrodes, the conductive paste is baked or thermally cured to form a conductive film, and further, the end surfaces of the component main body are subjected to electroplating, thereby forming an electroplating film so as to be connected to the conductive film on the ridge sections. According to this method, the thickness of external terminal electrodes at the end surfaces can be reduced.

Furthermore, Japanese Unexamined Patent Publication No. 63-169014 discloses a method in which a conductive metal film is deposited by electroless plating on the entire sidewall surface of a component main body, at which internal electrodes are exposed, so as to short circuit the internal electrodes exposed at the sidewall surface.

However, in the methods for forming external terminal electrodes as described in Japanese Unexamined Patent Publication No. 2004-146401 and Japanese Unexamined Patent Publication No. 63-169014, plating is performed directly onto the ends at which the internal electrodes are exposed. Thus, a plating solution entering the component main body along the interfaces between the internal electrodes and the insulator layers may erode the ceramic defining the insulator layers and the internal electrodes, thereby causing structural defects. Furthermore, this results in defects in terms of reliability, such as degraded load characteristics against humidity for the laminated electronic component.

In particular, when tin or gold plating is to be applied, the problems described above are more likely to occur because a tin or gold plating solution generally contains a highly corrosive complexing agent.

In order to solve the problems described above, for example, the International Publication No. WO2007/119281 discloses applying a water repellent to end surfaces of a component main body at which respective ends of internal electrodes are exposed, to fill gaps at interfaces between insulator layers and the internal electrodes with this water repellent, and then, directly forming metal layers defining bases of external terminal electrodes by plating on the end surfaces. The application of such a water repellent can improve the lifetime characteristics in the load test against humidity.

However, the technique described in International Publication No. WO2007/119281 has the following problems.

The water repellent is likely to adhere to the ceramic sections provided by the insulator layers rather than the metal sections provided by the internal electrodes. If the distance between the internal electrodes is relatively large (that is, when the insulator layers are thick and the number of laminated internal electrodes is small), most portions of the end surfaces at which the respective ends of the internal electrodes are exposed will be covered with the water repellent, thereby decreasing the depositions plated to the end surfaces at which the internal electrodes are exposed.

Furthermore, for the purpose of improving the fixing strength of the external terminal electrodes to the component main body, a heat treatment may be performed at a temperature of 800° C. or more after the formation of the metal layers. However, such a heat treatment will cause the water repellent to disappear.

Moreover, for example, International Publication No. WO2008/023496 suggests forming metal layers defining bases of external terminal electrodes by plating on end surfaces of a component main body at which respective ends of internal electrodes are exposed, and then forming layers composed of a conductive resin on the metal layers. International Publication No. WO2008/023496 also discloses that metal layers composed of nickel or copper are formed on the conductive resin layers by plating in order to prevent solder erosion upon solder joint, and that metal layers composed of tin or gold are further formed thereon by plating in order to improve solderability.

According to the technique described in International Publication No. WO2008/023496, with the metal layers formed by plating as bases, the conductive resin layers are formed thereon. Thus, stress caused by deflection of a substrate mounted with the laminated electronic component is reduced, thereby reducing crack defects.

However, the technique described in International Publication No. WO2008/023496 has the following problem.

As described above, a tin or gold plating solution generally contains a highly corrosive complexing agent. Thus, for example, if the treatment for providing water repellency is to be performed as described in International Publication No. WO2007/119281, it is necessary to perform the treatment for providing water repellency before the plating step of forming the metal layers composed of tin or gold. However, for example, when a treatment for providing strong water repellency is performed after the formation of the conductive resin layers, plating adhesion onto the conductive resin layers will be deteriorated, and problems such as no plating adhesion will be likely to occur. Particularly when the metal layers defining bases of the external terminal electrodes are formed directly by plating as in the technique described in International Publication No. WO2008/023496, rather than by baking, this problem will become more serious because the use of a water repellent with strong water repellency is desired.

It is to be noted that it is not a known technique but just a hypothetical technique suggested by the inventor(s) of the present application to further perform the treatment for providing water repellency to the external terminal electrodes with the conductive resin layers having been formed.

SUMMARY OF THE PRESENT INVENTION

To overcome the problems described above, preferred embodiments of the present invention provide a method for manufacturing a laminated electronic component and a laminated electronic component manufactured in accordance with the novel manufacturing method of the present invention.

A preferred embodiment of the present invention provides a method for manufacturing a laminated electronic component including the steps of preparing a component main body having a laminated structure, the component main body having a plurality of internal electrodes formed therein, and the internal electrodes each being partially exposed on an external surface of the component main body, and forming an external terminal electrode on the external surface of the component main body such that the external terminal electrode is electrically connected to the internal electrodes. In order to solve the technical problems described above, the step of forming the external terminal electrode includes the steps of forming a metal layer on exposed surfaces of the internal electrodes of the component main body, applying a water repellant at least on a surface of the metal layer and on a section in the external surface of the component main body, where an end edge of the metal layer is located, and then forming a conductive resin layer on the metal layer having the water repellant applied thereto.

The step of forming the metal layer preferably includes the step of forming the metal layer by plating. In this case, preferably, the step of forming the external terminal electrode further includes the step of subjecting the component main body having the metal layer formed thereon to a heat treatment, between the step of forming the metal layer and the step of applying the water repellant.

In the method for manufacturing a laminated electronic component according to this preferred embodiment of the present invention, preferably, the water repellent primarily includes a silane coupler or silicone resin including fluorine in a functional group.

Another preferred embodiment of the present invention provides a laminated electronic component including a component main body having a laminated structure, the component main body including a plurality of internal electrodes provided therein, and the internal electrodes each being partially exposed on an external surface of the component main body, and an external terminal electrode arranged on the external surface of the component main body such that the external terminal electrode is electrically connected to the internal electrodes. In the laminated electronic component according to this preferred embodiment of the present invention, the external terminal electrode includes a metal layer provided on exposed surfaces of the internal electrodes in the component main body, a conductive resin layer provided on the metal layer, and a water repellent film provided between the metal layer and the conductive resin layer.

In the laminated electronic component according to this preferred embodiment of the present invention, the metal layer is preferably defined by a plated layer. In this case, more preferably, an interdiffusion layer is provided in the internal electrode in a region with a length of about 2 μm or more, for example, from a boundary of the metal layer.

Further, the water repellent film preferably includes a water repellent primarily including a silane coupler or a silicone resin including fluorine in a functional group.

According to preferred embodiments of the present invention, the external terminal electrode includes both the conductive resin layer and the water repellent film. Thus, stress caused by deflection of the substrate can be minimized and prevented. Therefore, resistance to substrate deflection which minimizes and prevents the occurrence of defects, such as cracks, can be combined with the water repellency which prevents a plating solution from entering the inside of the component main body.

Furthermore, after the metal layer is formed on the exposed surfaces of the internal electrodes in the component main body, the water repellent is applied, and the conductive resin layer is then formed. Thus, in the case of applying plating onto the conductive resin layer, the problems associated with no plating adhesion can be prevented even with the use of the water repellent with strong water repellency.

Furthermore, adhesion of the conductive resin layer can be improved by the interposition of the water repellent.

Moreover, the water repellent film is covered with the resin component included in the conductive resin layer, thereby improving the water repellent.

In preferred embodiments of the present invention, when the metal layer is formed by plating on the exposed surfaces of the internal electrodes in the component main body, the laminated electronic component can be reduced in size, and resistance to substrate deflection can be further improved.

In preferred embodiments of the present invention, when, after the step of forming the metal layer by plating, the component main body with the metal layer formed thereon is subjected to a heat treatment so as to form an interdiffusion layer in a region in the internal electrode, with a length of about 2 μm or more, for example, from the boundary of the metal layer, the interface between the component main body and the external terminal electrode is advantageously sealed, thus further improving the load characteristics against humidity.

In preferred embodiments of the present invention, when the water repellent to be used primarily includes a silane coupler or a silicone resin including fluorine in a functional group, strong water repellency can be provided, thus obtaining higher load characteristics against humidity.

These and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
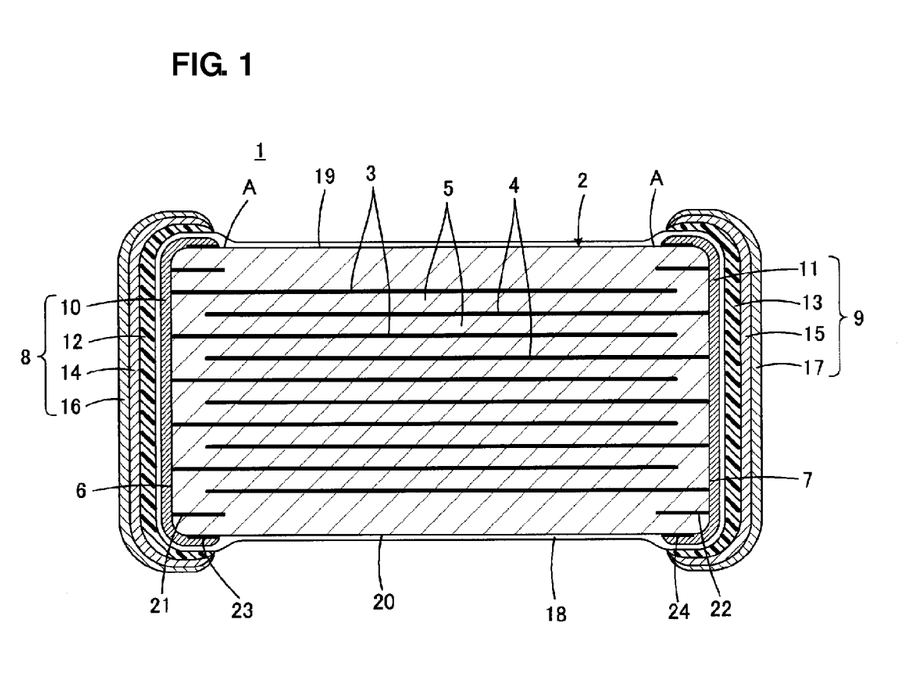
FIG. 1 is a cross-sectional view illustrating a laminated electronic component manufactured in accordance with a manufacturing method according to a preferred embodiment of the present invention.

With reference to FIG. 1, a laminated electronic component 1 includes a component main body 2 having a laminated structure. The component main body 2 includes a plurality of internal electrodes 3 and 4 provided therein. More specifically, the component main body 2 includes a plurality of laminated insulator layers 5, and a plurality of layered internal electrodes 3 and 4 provided along interfaces between the adjacent insulator layers 5.

When the laminated electronic component 1 defines a laminated ceramic capacitor, the insulator layers 5 are preferably composed of a dielectric ceramic. It is to be noted that the laminated electronic component 1 may define a different element, such as an inductor, a thermistor, or a piezoelectric component, for example. Therefore, depending on the function of the laminated electronic component 1, the insulator layers 5 may be composed of a dielectric ceramic, or alternatively, a magnetic ceramic, a semiconductor ceramic, or a piezoelectric ceramic, or, may be composed of a material including a resin, for example.

Ends of the plurality of internal electrodes 3 and ends of the plurality of internal electrodes 4 are respectively exposed at one end surface and the other end surface 6 and 7 of the component main body 2, and external terminal electrodes 8 and 9 are respectively arranged so as to electrically connect the ends of the internal electrodes 3 to each other and the ends of the internal electrodes 4 to each other.

It is to be noted that, while the laminated electronic component 1 shown in the FIG. 1 is a two-terminal laminated electronic component provided with the two external terminal electrodes 8 and 9, preferred embodiments of the present invention can be applied to multi-terminal laminated electronic components.

The external electrodes 8 and 9 respectively include first metal layers 10 and 11 provided on the exposed surfaces of the internal electrodes 3 and 4 in the component main body 2, namely, on the end surfaces 6 and 7, conductive resin layers 12 and 13 provided on the first metal layers 10 and 11, and second metal layers 14 and 15 provided on the conductive resin layers 12 and 13, and third metal layers 16 and 17 provided on the second metal layers 14 and 15.

The first metal layers 10 and 11 are respectively provided to electrically connect the plurality of internal electrodes 3 to each other and internal electrodes 4 to each other, and, for example, preferably primarily include copper. While it is preferable that the first metal layers 10 and 11 be formed directly on the end surfaces 6 and 7 of the component main body 2 by plating, alternatively, a conductive paste may be applied and baked to form the first metal layers 10 and 11.

The conductive resin layers 12 and 13 are provided to improve resistance to substrate deflection, which are formed by applying and thermally curing a conductive resin with conductive metal powders dispersed in an uncured thermosetting resin. An epoxy resin with silver powders dispersed therein is preferably used as the conductive resin, for example.

The second metal layers 14 and 15 and the third metal layers 16 and 17 are provided to improve the mounting property of the laminated electronic component 1, and are formed when necessary. The second metal layers 14 and 15 are provided to suppress solder erosion, and are preferably composed of a plating film primarily including, for example, nickel. The third metal layers 16 and 17 are provided to improve solderability, and are preferably composed of a plating film primarily including, for example, tin or gold. The plating primarily including tin also includes, for example, Sn—Pb solder plating. In addition, the plating primarily including nickel also includes Ni—P plating by electroless plating.

Further, when the first metal layers 10 and 11 are composed of a plating layer primarily including copper as described above, the favorable throwing power of copper can improve the efficiency of the plating process and increase the fixing strength of the external terminal electrodes 8 and 9. However, alternatively, the first metal layers 10 and 11 may be composed of nickel and the second metal layers 14 and 15 may not be provided.

When the first metal layers 10 and 11 are to be formed by plating, the plating method for forming the first metal layers 10 and 11 and the plating method for forming the second metal layers 14 and 15 as well as the third metal layers 16 and 17 may preferably be formed by electroless plating for depositing metal ions with the use of a reducing agent, or electroplating through an electrifying process.

In the respective external terminal electrodes 8 and 9, a water repellent film 18 is provided between the first metal layers 10 and 11 and the conductive resin layers 12 and 13. While the type of the water repellent used for forming the water repellent film 18 is not particularly limited as long as it prevents the plating solution or moisture from entering, a water repellent which primarily includes, for example, a silane coupler or a silicone resin containing fluorine in a functional group is preferably used. Such a water repellent can exert strong water repellency, thus obtaining higher load characteristics against humidity. It is to be noted that the thickness of the water repellent film 18 is magnified in FIG. 1, and it should be understood that the water repellent film 18 is actually not as thick as shown in the FIG. 1.

The treatment for providing water repellency may also be performed on the conductive resin layers 12 and 13. However, when the second metal layers 14 and 15 and the third metal layers 16 and 17 are to be formed by plating, it is preferable to select a water repellent with less water repellency, such as $CH_3O$—Si—$C_8H_{17}$, so as not to cause defects in the plating adhesion.

Next, a method for manufacturing the laminated electronic component 1 shown in FIG. 1, in particular, a method for forming the external terminal electrodes 8 and 9 will be described.

First, the component main body 2 is manufactured by a well known method. Next, the external terminal electrodes 8 and 9 are formed on the end surfaces 6 and 7 of the component main body 2 so as to be electrically connected to the internal electrodes 3 and 4.

For the formation of the external terminal electrodes 8 and 9, first, the first metal layers 10 and 11 are formed on the end surfaces 6 and 7 of the component main body 2. In the component main body 2 before being plated, the plurality of internal electrodes 3 exposed at one end surface 6 are electrically insulated from each other, and the plurality of internal electrodes 4 exposed at the other end surface 7 are electrically insulated from each other.

A case of forming the first metal layers 10 and 11 by plating is described below.

First, metal ions in a plating solution are deposited onto the respective exposed sections of the internal electrodes 3 and 4. In order to form the first metal layers 10 and 11, metal ions in a plating solution are first deposited onto the sections of each of the exposed internal electrodes 3 and 4. Then, the plated depositions are further grown to physically connect the plated depositions on the respective sections of the adjacent exposed internal electrodes 3 and the plated depositions on the respective sections of the adjacent exposed internal electrodes 4. In this manner, uniform and dense first metal layers 10 and 11 are formed.

In this preferred embodiment, the component main body 2 of the laminated electronic component 1 preferably has a substantially rectangular parallelepiped shape which includes a pair of principal surfaces 19 and 20 opposed to each other and a pair of side surfaces opposed to each other (not shown in FIG. 1), in addition to the pair of end surfaces 6 and 7 described above. Further, the first metal layers 10 and 11 described above are respectively formed on the pair of end surface 6 and 7 so that the end edges of the first metal layers 10 and 11 are located on the pair of principal surfaces 19 and 20 and the pair of side surfaces, which are adjacent to the end surfaces 6 and 7.

In order to allow the first metal layers 10 and 11 to be efficiently formed so that the end edges of the first metal layers 10 and 11 extend to the pair of principal surfaces 19 and and the pair of side surfaces as described above, it is preferable to form internal dummy conductors 21 and 22 on an outer layer section of the component main body 2 so as to be exposed at the end surfaces 6 and 7 and to form external dummy conductors 23 and 24 on ends of the principal surfaces 19 and 20 of the component main body 2, which are adjacent to the end surfaces 6 and 7. The internal dummy conductors 21 and 22 and the external dummy conductors 23 and 24 do not substantially contribute to the electrical characteristics, but cause deposition of metal ions for the formation of the first metal layers 10 and 11 as well as to promote the plating growth.

Furthermore, in order to adequately expose the internal electrodes 3 and 4 and the internal dummy conductors 21 and 22 at the end surfaces 6 and 7 before the plating step described above, it is preferable to polish the end surfaces 6 and 7 of the component main body 2. In this case, if polishing is performed to the extent that the respective exposed ends of the internal electrodes 3 and 4 and the internal dummy conductors 21 and 22 project from the end surfaces 6 and 7, the respective exposed edges will be spread in a planar direction, thereby reducing the energy required for the plating growth.

Figure 2:
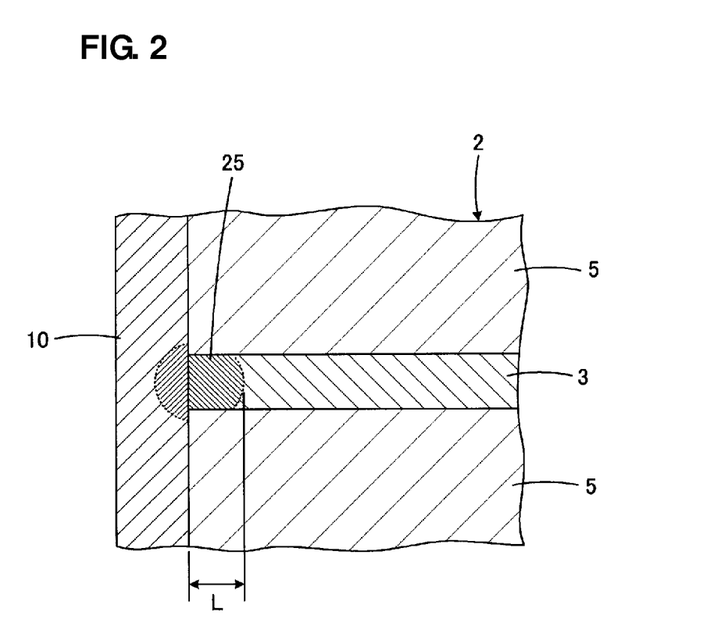
FIG. 2 is an enlarged cross-sectional view illustrating a section of a component main body provided with a first metal layer thereon and then subjected to a heat treatment for the purpose of forming an external terminal electrode, in the course of a manufacturing process of the laminated electronic component shown in FIG. 1.

Next, the component main body 2 with the first metal layers 10 and 11 formed thereon as described above is preferably subjected to a heat treatment. As a heat treatment temperature, for example, a temperature of about 600° C. or more, preferably about 800° C. or more is preferably used, for example. The state after this heat treatment is shown in FIG. 2. FIG. 2 shows the internal electrode 3 and the first metal layer 10. The structure on the side of the internal electrode 4 and the first metal layer 11 not shown in FIG. 2 is substantially the same as the structure on the side of the internal electrode 3 and the first metal layer 10 shown in FIG. 2, and description of the structure on the side of the internal electrode 4 and the first metal layer 11 will not be provided.

Referring to FIG. 2, an interdiffusion layer 25 is formed between the internal electrode 3 and the first metal layer 10. The interdiffusion layer 25 is preferably provided in a region with a length L of about 2 μm or more, for example, from the boundary between the internal electrode 3 and the first metal layer 10. In other words, the heat treatment is preferably performed such that the length L is about 2 μm or more, for example. Such formation of the interdiffusion layer 25 further improves the effect of preventing moisture from entering the inside of the component main body 2.

Furthermore, when nickel is included as the conductive component of the internal electrodes 3 and the first metal layer 10 primarily includes copper, a heat treatment will interdiffuse the copper and nickel. When the interdiffusion layer 15 is formed by the interdiffusion between the copper and the nickel, the fixing strength of the first metal layer 10 can be increased.

On the other hand, when the first metal layers 10 and 11 are to be formed by baking a conductive paste, the conductive paste is applied onto the end surfaces 6 and 7 of the component main body 2 and baked to form the first metal layers 10 and 11.

Next, in order to form the water repellent film 18 described above, a step of applying a water repellent is performed. It is sufficient to apply the water repellent at least onto the surfaces of the first metal layers 10 and 11 and onto sections in the external surface of the component main body 2, where respective end edges of the first metal layers 10 and 11 are located. However, in this preferred embodiment, the water repellent is preferably applied onto the entire surface of the component main body 2 with the first metal layers 10 and 11 formed thereon since the method of immersing the component main body 2 in a solution including the water repellent is used to apply the water repellent. It is to be noted that other methods, such as spraying, for example, may be used to apply the water repellent.

The water repellent film 18 is uniformly formed in a relatively thin film on the first metal layers 10 and 11. As a result, the water repellent adheres in the form of a relatively thick film to the principal surfaces 19 and 20 of the component main body 2 as well as to sections A where the end edges of the first metal layers 10 and 11 are located on the side surfaces. This adhesion more effectively prevents moisture from entering through the gaps between the end edges of the first metal layers 10 and 11 and the principal surfaces 19 and 20 as well as the side surfaces.

When a silane coupler, for example, is used as the water repellent as described above, the silane coupler preferably adheres to the ceramic surface because the silane coupler is strongly bonded to OH groups. On the other hand, a thin and uniform natural oxidation film is present on the surfaces of the first metal layers 10 and 11, thus allowing the water repellent film 18 to be formed uniformly in the form of a thin film on the natural oxidation film.

Next, the conductive resin layers 12 and 13 are formed on the first metal layers 10 and 11 with the water repellent having been provided thereon. In order to form the conductive resin layers 12 and 13, for example, a conductive resin with silver powders dispersed in an uncured epoxy resin is preferably applied onto the first metal layers 10 and 11 and thermally cured.

Next, the second metal layers 14 and 15 are formed using a plating film preferably primarily including, for example, nickel. The second metal layers 14 and 15 are formed after the formation of the conductive resin layers 12 and 13, and thus, can be easily formed by an ordinary method. This is because the locations to be plated form a conductive and continuous surface when the second metal layers 14 and 15 are formed. Further, since the water repellent film 18 which may interfere with plating adhesion is located underneath the conductive resin layers 12 and 13, the problem of inhibiting plating deposition of the second metal layers 14 and 15 due to the water repellent film 18 is not likely to occur.

Next, the third metal layers 16 and 17 are formed on the second metal layers 14 and 15, with use of a plating film preferably primarily including, for example, tin or gold.

Next, non-limiting experimental examples will be described, which were performed to confirm the advantageous effects of the present invention.

In Experimental Example 1, a laminated ceramic capacitor as a sample was manufactured in the following steps:
(1) preparation of a component main body
(2) electrolytic copper plating
(3) heat treatment
(4) application of water repellent
(5) application of conductive resin paste
(6) curing of conductive resin paste
(7) electrolytic nickel plating
(8) electrolytic tin plating It is to be noted that cleaning with pure water was performed after each of the plating steps (2), (7), and (8).

Details of each of the steps (1) to (8) are described as follows.

(1) Preparation of Component Main Body

A component main body for a laminated ceramic capacitor, with a length of 0.94 mm, a width of 0.47 mm, and a height 0.47 mm and with an acquired capacitance of 2.2 µF, for example, was prepared in which insulator layers were composed of a barium titanate based dielectric ceramic, internal electrodes primarily included nickel, the insulator layer between the adjacent internal electrodes had a thickness of 1.5 µm, and the number of the laminated internal electrodes was 220, for example. Furthermore, this component main body was provided with internal dummy conductors and external dummy conductors.

(2) Electrolytic Copper Plating

TABLE 1

| | Copper Strike Bath | |
|---|---|---|
| Plating Bath | copper pyrophosphate | 14 g/liter |
| | pyrophosphoric acid | 120 g/liter |
| | potassium oxalate | 10 g/liter |
| | pH | 8.7 |
| | Bath Temperature | 25° C. |

TABLE 2

| | Thick Copper Bath | |
|---|---|---|
| Plating Bath | Pyro-Bright Process from C. Uyemura & Co., Ltd. | |
| | pH | 8.6 |
| | Bath Temperature | 55° C. |

Into a 300 ml horizontal rotating barrel, 500 pieces of the component main bodies were input, and in addition, 100 ml of conductive media having 0.7 mm in diameter were input. Then, the horizontal rotating barrel was immersed in the copper strike bath shown in Table 1, and an electric current was applied at a current density of $0.10 \text{ A/dm}^2$ while rotating the horizontal rotating barrel at a barrel peripheral velocity of 2.6 m/minute, thereby performing copper strike plating until a film thickness became 1 µm.

Then, the same horizontal rotating barrel was immersed in the thick copper bath shown in Table 2, and an electric current was applied at a current density of $0.30 \text{ A/dm}^2$ while rotating the horizontal rotating barrel at the same barrel peripheral velocity, thereby performing thick copper plating until a film thickness became 5 µm.

(3) Heat Treatment

The component main body with the copper plating layers formed thereon as described above was subjected to a heat treatment at a temperature of 800° C. for 5 minutes.

(4) Application of Water Repellent

Next, the component main bodies each with the copper plating layer formed thereon and subjected to a heat treatment were immersed in a liquid containing a water repellent as shown in Table 3 at room temperature for 5 minutes so as to apply the water repellent.

TABLE 3

| Sample No. | Water Repellent |
|---|---|
| 1 | $(CH_3O)_3$—Si—$(CH_2)_9$—$CH_3$ |
| 2 | $(CH_3O)_3$—Si—$CH_3$ |
| 3 | $(CH_3O)_3$—Si—$(CH_2)_3$—$NH_2$ |
| 4 | $(CH_3O)_3$—Si—$CH_2CH_2C_8F_{17}$ |
| 5 | NK Guard FGN-37 (from NICCA CHEMICAL CO., LTD.) |
| 6 | Adesso WR (from NICCA CHEMICAL CO., LTD.) |
| 7 | Not Treated |
| 8 | X-41-1805 (Shin-Etsu Chemical Co., Ltd.) |

In Table 3, sample 7 is used in comparative examples outside of the scope of the present invention.

The water repellents for samples 1 to 4 were used after being diluted to 3 weight % with the use of IPA, and drying after the immersion was performed at a temperature of 150° C. for 30 minutes. Regarding the water repellent for each of samples 5, 6, and 8, an undiluted solution was used, and drying after the immersion was performed at 105° C. for 15 minutes and at 180° C. for 1 minute.

The treatment with the water repellent was not performed to Sample 7 as a comparative example.

(5) Application of Conductive Resin Paste

Next, a conductive resin paste with silver powders dispersed in an uncured epoxy resin at ratios of 50 volume %, 45 volume %, and 5 volume % respectively for the silver powders, the epoxy resin, and a curing agent, was applied onto the copper plating layer with the water repellent having been applied.

(6) Curing of Conductive Resin Paste

Next, the conductive resin paste was cured under the curing conditions of maintaining at a temperature of 200° C. in the air for 60 minutes to 120 minutes so as to form a conductive resin layer on the copper plating layer with the water repellent having been applied thereon.

(7) Nickel Electroplating

Next, into a 300 ml horizontal rotating barrel, 30 ml of the component main bodies were input, and in addition, 70 ml of soldering balls having a diameter of 0.7 mm were input. Then, the horizontal rotating barrel was immersed in a Watts bath (weakly acid nickel bath) set at a temperature of 60° C. and pH 4.2, and electroplating was performed at a current density of 0.20 A/dm$^2$ for 60 minutes while rotating the horizontal rotating barrel at 20 rpm (revolutions per minute), thereby forming a nickel plating layer of about 4 μm in thickness on the conductive resin layer.

(8) Electrolytic Tin Plating

Next, while using the horizontal rotating barrel as in the above step (7), NB-RZS from Ishihara Chemical Co., Ltd. was used as a plating bath and was set at a temperature of 30° C. and pH 4.5 to perform electroplating at a current density of 0.10 A/dm$^2$ for 60 minutes, thereby forming a tin plating layer of about 4 μm in thickness on the nickel plating layer.

A humidity-proof reliability test (temperature: 125° C., relative humidity: 95%, applied voltage: 6.3 V) was performed for laminated ceramic capacitors obtained from the respective samples. Then, in a case where the insulation resistance after a lapse of 144 hours was 1 MΩ or less, such samples were regarded as defective, and the number of defective samples was obtained out of 20 samples. The results are shown as "the number of defectives in reliability test" in Table 4.

TABLE 4

| Sample No. | The Number of Defectives in Reliability Test (out of 20 pieces) |
| --- | --- |
| 1 | 0 |
| 2 | 0 |
| 3 | 0 |
| 4 | 0 |
| 5 | 0 |
| 6 | 0 |
| 7 | 10 |
| 8 | 0 |

From Table 4, with respect to samples 1 to 6 and 8, no defective samples were found in the reliability test. In contrast, ten defective samples were generated with respect to sample 7.

In Experimental Example 2, laminated ceramic capacitors were manufactured as samples in accordance with the following steps:

(1) Preparation of Component Main Body
(2) application of conductive paste
(3) baking
(4) application of water repellent
(5) application of conductive resin paste
(6) curing of conductive resin paste
(7) electrolytic nickel plating
(8) electrolytic tin plating In this experimental example, each of the steps (1) and (4) to (8) was performed under the same conditions as in Experimental Example 1. In addition, in the step (4) of applying the water repellent, the water repellents that are the same as that shown in Table 3 were used in the same manner. It is to be noted that samples 11 to 18 in Table 5 shown below correspond to samples 1 to 8 in Table 3.

Details of each of the steps (2) and (3) are described as follows.

(2) Application of Conductive Paste

A conductive paste including copper powders, B—Si based glass, a resin, and a solvent respectively at 25 volume %, 5 volume %, 20 volume %, and 50 volume %, was applied to respective end surfaces of the component main bodies.

(3) Baking

The component main bodies with the conductive paste applied as described above were subjected to a heat treatment under the condition of maintaining at a temperature of 900° C. for 10 minutes under an atmosphere with an oxygen concentration of 10 ppm, thereby baking the conductive paste.

For laminated ceramic capacitors as the respective samples thus obtained, a humidity-proof reliability test was performed under the same conductions as those in Experimental Example 1, thereby obtaining the number of defective samples out of 20 samples. The results are shown in Table 5.

TABLE 5

| Sample No. | The Number of Defectives in Reliability Test (out of 20 pieces) |
| --- | --- |
| 11 | 0 |
| 12 | 0 |
| 13 | 0 |
| 14 | 0 |
| 15 | 0 |
| 16 | 0 |
| 17 | 8 |
| 18 | 0 |

From Table 5, with respect to samples 11 to 16 and 18, no defective samples were found in the reliability test. In contrast, eight defective samples were generated with respect to sample 17.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for manufacturing a laminated electronic component, the method comprising the steps of:
preparing a component main body having a laminated structure, the component main body including a plurality of internal electrodes formed therein, and each of the internal electrodes being partially exposed on an external surface of the component main body; and
forming an external terminal electrode on the external surface of the component main body such that the external terminal electrode is electrically connected to the internal electrodes; wherein
the step of forming the external terminal electrode includes the steps of:
forming a metal layer by plating on exposed surfaces of the internal electrodes of the component main body;
applying a water repellant on at least a surface of the metal layer and on a section of the external surface of the component main body at which an end edge of the metal layer is located so as to form a water repellant film that completely covers the entire end edge of the metal layer; and then forming a conductive resin layer on the metal layer that has the water repellant applied thereon.

2. The method for manufacturing a laminated electronic component according to claim 1, wherein the step of forming the external terminal electrode further includes the step of subjecting the component main body with the metal layer formed thereon to a heat treatment, between the step of forming the metal layer and the step of applying the water repellant.

3. The method for manufacturing a laminated electronic component according to claim 1, wherein the water repellent primarily includes a silane coupler or silicone resin including fluorine in a functional group.

4. A laminated electronic component comprising:
a component main body having a laminated structure, the component main body including a plurality of internal electrodes provided therein, and each of the internal electrodes being partially exposed on an external surface of the component main body; and
an external terminal electrode arranged on the external surface of the component main body such that the external terminal electrode is electrically connected to the internal electrodes; wherein
the external terminal electrode includes a metal layer provided on exposed surfaces of the internal electrodes of the component main body, a conductive resin layer provided on the metal layer, and a water repellent film provided between the metal layer and the conductive resin layer;
the water repellant film is disposed on at least a surface of the metal layer and on a section of the external surface of the component main body at which an end edge of the metal layer is located such that the entire end edge of the metal layer is completely covered with the water repellant film; and
the metal layer is defined by a plating layer.

5. The laminated electronic component according to claim 4, wherein an interdiffusion layer is provided in the internal electrode in a region with a length of about 2 μm or more from a boundary of the metal layer.

6. The laminated electronic component according to claim 4, wherein the water repellent film includes a water repellent primarily including a silane coupler or a silicone resin including fluorine in a functional group.

* * * * *